US012561011B2

(12) United States Patent
Liu et al.

(10) Patent No.: US 12,561,011 B2
(45) Date of Patent: Feb. 24, 2026

(54) CONTROL METHOD AND CONTROL SYSTEM FOR TOUCH PAD

(71) Applicant: ASUSTEK COMPUTER INC., Taipei (TW)

(72) Inventors: Wen-Yun Liu, Taipei (TW); Chun-Tsai Yeh, Taipei (TW); Shang-Chih Chung, Taipei (TW); Ya-Ting Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/773,193

(22) Filed: Jul. 15, 2024

(65) Prior Publication Data

US 2025/0284351 A1 Sep. 11, 2025

(30) Foreign Application Priority Data

Mar. 5, 2024 (TW) ................................. 113107930

(51) Int. Cl.
*G06F 3/0354* (2013.01)
*G06F 3/038* (2013.01)

(52) U.S. Cl.
CPC .......... *G06F 3/03547* (2013.01); *G06F 3/038* (2013.01)

(58) Field of Classification Search
CPC ............................. G06F 3/03547; G06F 3/038
See application file for complete search history.

(56) References Cited

U.S. PATENT DOCUMENTS

2011/0199314 A1* 8/2011 Laberge .............. G06F 3/04883
345/173
2015/0020035 A1* 1/2015 Liang .................. G06F 3/04883
715/863
2021/0333884 A1* 10/2021 Li .......................... G06V 10/25

FOREIGN PATENT DOCUMENTS

CN 102096490 A 6/2011
CN 110471543 A 11/2019
CN 112882589 A 6/2021
TW 579020 U 3/2004
TW 201723796 A 7/2017

* cited by examiner

*Primary Examiner* — Jonathan A Boyd

(74) *Attorney, Agent, or Firm* — MUNCY, GEISSLER, OLDS & LOWE, P.C.

(57) ABSTRACT

A control method is provided, applied to a touch pad. The control method includes: setting a function area on the touch pad, where the function area corresponds to a preset function gesture, and the preset function gesture corresponds to a preset function and includes a corresponding trigger condition; detecting a first gesture by using the touch pad; determining whether the first gesture falls within the function area; when the first gesture falls within the function area, determining whether the first gesture matches the preset function gesture; when the first gesture matches the preset function gesture, determining whether the first gesture meets the trigger condition of the preset function gesture; and when the first gesture meets the trigger condition, triggering the preset function by using the first gesture. The disclosure further provides a control system configured for a touch pad.

10 Claims, 12 Drawing Sheets

CONTROL METHOD AND CONTROL SYSTEM FOR TOUCH PAD

CROSS-REFERENCE TO RELATED APPLICATION

This application claims the priority benefit of Taiwan application serial No. 113107930, filed on Mar. 5, 2024. The entirety of the above-mentioned patent application is hereby incorporated by reference herein and made a part of the specification.

BACKGROUND OF THE INVENTION

Field of the Invention

The disclosure relates to the field of human-machine interface technologies, and in particular, to a control method and a control system for a touch pad.

Description of the Related Art

With the popularization of use of notebook computers, operating manners of the notebook computers become diversified. A user often needs to use different physical input devices in different use scenarios.

Conventionally, if the user needs to use an input device that is not included in the notebook computer, such as a mouse or a knob device, the user can only connect these additional physical input devices to the notebook computer. In this case, additional burdens on costs and carrying are caused to the user.

BRIEF SUMMARY OF THE INVENTION

The disclosure provides a control method, applied to a touch pad. The control method includes: setting a function area on the touch pad, where the function area corresponds to a preset function gesture, and the preset function gesture corresponds to a preset function and includes a corresponding trigger condition; detecting a first gesture by using the touch pad; determining whether the first gesture falls within the function area; when the first gesture falls within the function area, determining whether the first gesture matches the preset function gesture; when the first gesture matches the preset function gesture, determining whether the first gesture meets the trigger condition of the preset function gesture; and when the first gesture meets the trigger condition, triggering the preset function by using the first gesture.

The disclosure further provides a control method, applied to a touch pad. The control method includes: setting a plurality of function areas on the touch pad, where each of the function areas corresponds to a preset function gesture, and each preset function gesture corresponds to a preset function and includes a corresponding trigger condition; determining whether the first gesture falls within one of the function areas; when the first gesture falls within one of the function areas, determining whether the first gesture matches a preset function gesture corresponding to the function area within which the first gesture falls; when the first gesture matches the preset function gesture, determining whether the first gesture meets the trigger condition of the preset function gesture; and when the first gesture meets the trigger condition, triggering the preset function by using the first gesture.

The disclosure further provides a control system, configured for a touch pad. The control system includes a setting unit, a gesture recognition unit, and a function unit. The setting unit is electrically coupled to the touch pad, and configured to set a function area on the touch pad. The function area corresponds to a plurality of preset function gestures, and the plurality of preset function gestures corresponds to a preset function and includes a corresponding trigger condition. The gesture recognition unit is electrically coupled to the touch pad, and configured to: detect a first gesture by using the touch pad; determine whether the first gesture falls within the function area; when the first gesture falls within the function area, determine whether the first gesture matches the preset function gesture; when the first gesture matches the preset function gesture, determine whether the first gesture meets the trigger condition of the preset function gesture; and when the first gesture meets the trigger condition, generate a function trigger signal according to the first gesture. The function unit is configured to receive the function trigger signal to perform the preset function.

Through the control method and the control system provided in the disclosure, a user can replace a physical input device or an input interface with the function area on the touch pad to perform the preset function. In this way, multiplexing of the touch pad is improved, and functions of other physical input devices (such as a mouse, a knob device, and a key device) are replaced, thereby reducing user burden on cost and carrying of the devices.

DETAILED DESCRIPTION OF THE EMBODIMENTS

Specific embodiments of the disclosure are described in more detail below with reference to the accompanying drawings. Advantages and features of the disclosure become clearer according to the following descriptions and claims. It is to be noted that the drawings are drawn by using a simplified form and imprecise proportion, which are only used for conveniently and clearly assisting in describing the objective of the embodiments of the disclosure.

Figure 1:
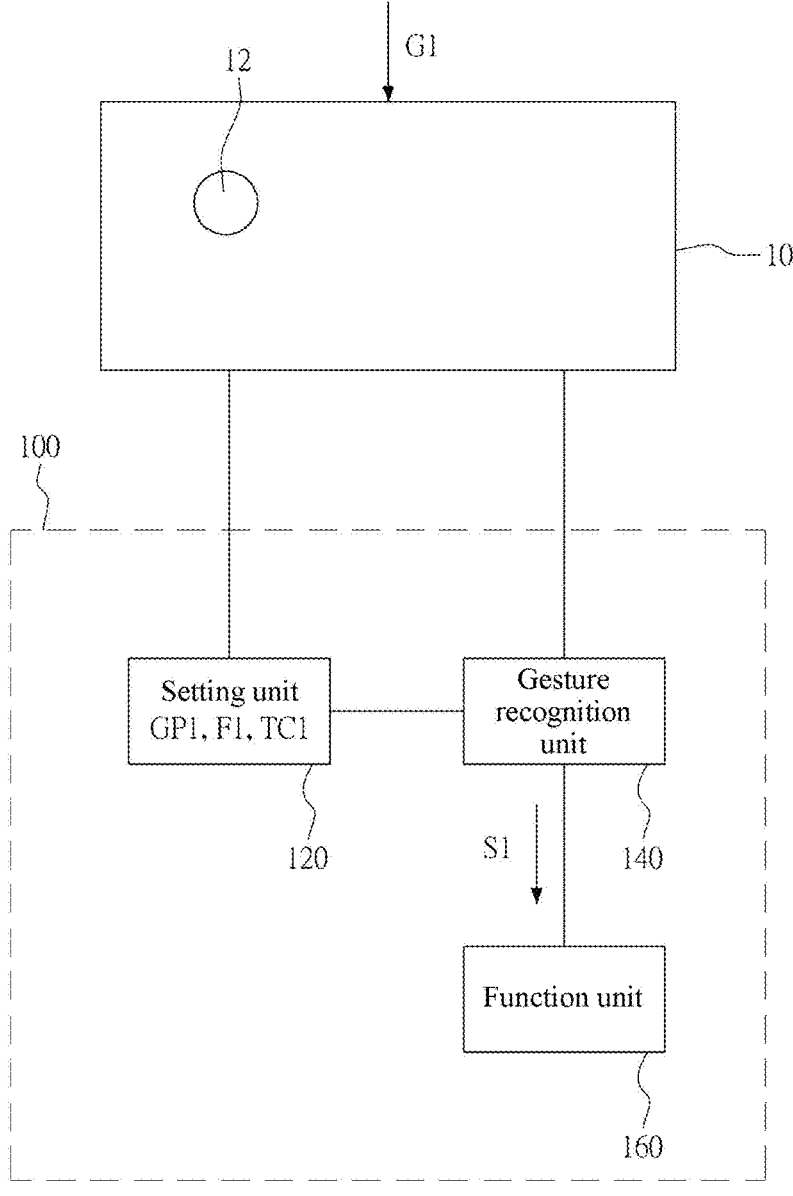
FIG. 1 is a schematic block diagram of a control system according to an embodiment of the disclosure.

FIG. 1 is a schematic diagram of a control system according to an embodiment of the disclosure. A control system 100 is configured to control a touch pad 10.

As shown in the figure, the control system 100 includes a setting unit 120, a gesture recognition unit 140, and a function unit 160.

The setting unit 120 is electrically coupled to the touch pad 10, and is configured to set at least one function area layout on the touch pad 10. Each function area layout includes at least one function area. One function area layout is shown in the figure. The function area layout includes a function area 12.

The function area 12 is set to corresponding to a preset function gesture GP1. The preset function gesture GP1 corresponds to a preset function F1, and includes a corresponding trigger condition TC1. In an embodiment, the preset function gesture GP1, the preset function F1, and the trigger condition TC1 are all set by using the setting unit 120, and related setting data is also stored in the setting unit 120.

The function area layout in this embodiment includes only one circular function area 12. In other embodiments, the function area 12 is alternatively in a shape of a horizontal bar, a vertical bar, a square, or another geometric shape. A position of the function area 12 is also adjusted by the user by using the setting unit 120. In addition, according to an actual requirement, the user alternatively sets, on the touch pad 10 by using the setting unit 120, a plurality of function areas corresponding to different preset functions F1.

The gesture recognition unit 140 is electrically coupled to the touch pad 10, to be configured to detect a first gesture G1 by using the touch pad 10, and determine whether the first gesture G1 falls within the function area 12. In an embodiment, the gesture recognition unit 140 determines, according to a coordinate position of the first gesture G1 on the touch pad 10, whether the first gesture G1 falls within the function area 12.

When it is determined that the first gesture G1 falls within the function area 12, the gesture recognition unit 140 further determines whether the first gesture G1 matches the preset function gesture GP1.

In an embodiment, the gesture recognition unit 140 compares data of the first gesture G1 with a feature parameter of the preset function gesture GP1, to determine whether the first gesture G1 matches the preset function gesture GP1. In an embodiment, when the preset function gesture GP1 is a horizontal slide gesture, the feature parameter is an angle value relative to a horizontal direction. When the preset function gesture GP1 is an arc slide gesture, the feature parameter is a rotation angle relative to a center point.

When the gesture recognition unit 140 determines that the first gesture G1 matches the preset function gesture GP1 and meets the trigger condition TC1 of the preset function gesture GP1, the first gesture recognition unit 140 generates a function trigger signal S1 according to the first gesture G1. When the gesture recognition unit 140 determines that the first gesture G1 does not fall within the function area 12, or falls within the function area 12 but does not match the preset function gesture GP1, the gesture recognition unit 140 interprets the first gesture G1 as a touch pad gesture, in other words, considers the first gesture G1 as a general touch pad input signal.

The preset function gesture GP1 is related to a shape of the function area 12. In an embodiment, when the function area 12 is in a shape of a circle, the preset function gesture GP1 corresponding to the function area 12 is an arc slide gesture, and the trigger condition TC1 corresponding to the preset function gesture GP1 is that a rotation angle of the arc slide gesture relative to the center point of the function area 12 exceeds a preset angle.

When the function area 12 is in the shape of a horizontal bar, the preset function gesture GP1 corresponding to the function area 12 is a horizontal slide gesture, and the trigger condition TC1 corresponding to the preset function gesture GP1 is that a horizontal movement distance exceeds a preset length.

When the function area 12 is in the shape of a vertical bar, the preset function gesture GP1 corresponding to the function area 12 is a vertical slide gesture, and the trigger condition TC1 corresponding to the preset function gesture GP1 is that a vertical movement distance exceeds a preset length.

The function unit 160 is configured to receive the function trigger signal S1 to perform the preset function F1. The preset function F1 is volume adjustment, screen brightness adjustment, brush thickness adjustment, function switching, or the like.

Figure 2:
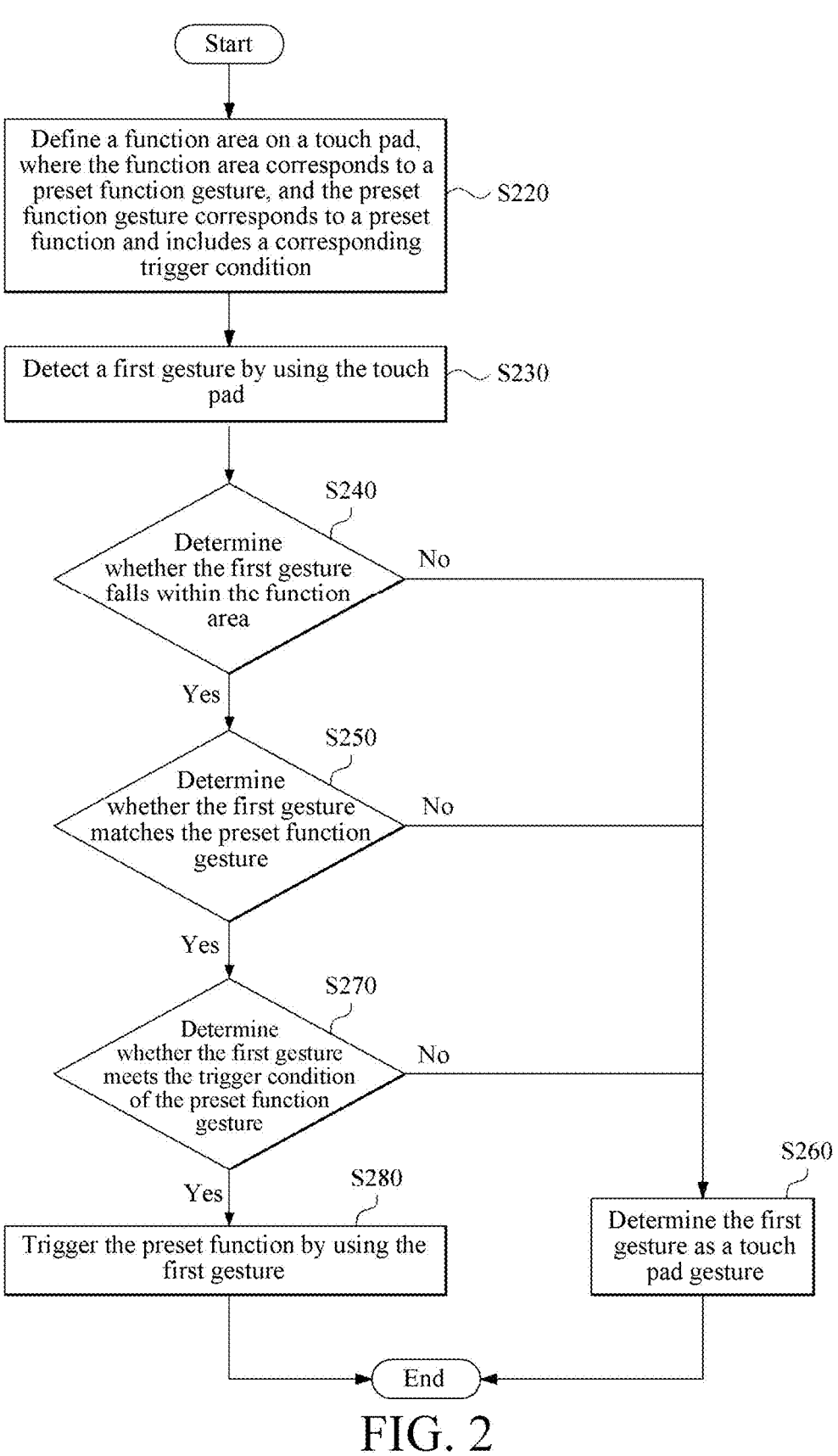
FIG. 2 is a flowchart of a control method according to a first embodiment of the disclosure.

FIG. 2 is a flowchart of a control method according to a first embodiment of the disclosure. The control method is applicable to the control system 100 shown in FIG. 1, to control a touch pad 10. The control method includes the following steps.

First, in a setting stage, as described in step S220, a function area 12 is set on the touch pad 10 as a function area layout. The function area 12 corresponds to a preset function gesture GP1. The preset function gesture GP1 corresponds to a preset function F1 and includes a corresponding trigger condition TC1. Step S220 is performed by the setting unit 120.

Subsequently, in an operation stage, as described in step S230, a first gesture G1 is detected by using the touch pad 10.

Then, as described in a determining step S240, whether the first gesture G1 falls within the function area 12 is determined. The determining step is performed by the gesture recognition unit 140.

When it is determined that the first gesture G1 falls within the function area 12, the process goes forward to a determining step S250 in which whether the first gesture G1 matches the preset function gesture GP1 is determined. On the contrary, when the first gesture G1 does not fall within the function area 12, the process goes forward to step S260 in which the first gesture G1 is determined as a general touch pad gesture for interpretation.

In an embodiment, before the step of determining whether the first gesture G1 matches the preset function gesture GP1, whether the first gesture G1 belongs to a touch pad gesture is determined in advance, and when the first gesture G1 does not belong to the touch pad gesture, whether the first gesture G1 matches the preset function gesture GP1 is then determined. This embodiment is applicable to a case in which the preset function gesture GP1 is different from a general touch pad gesture.

In the determining step S250, when the first gesture G1 matches the preset function gesture GP1, the processes goes forward to a determining step S270 in which whether the first gesture G1 meets the trigger condition TC1 of the preset function gesture GP1 is determined. On the contrary, when the first gesture G1 does not match the preset function gesture GP1, the process goes forward to step S260 in which the first gesture G1 is determined as the touch pad gesture for interpretation.

In the determining step S270, when the first gesture G1 meets the trigger condition TC1, the process goes forward to step S280 in which the preset function F1 is triggered by using the first gesture G1. On the contrary, when the first gesture G1 does not meet the trigger condition TC1, the process returns to the determining step S250.

Steps S250 to S270 are performed by the gesture recognition unit 140, and step S280 is performed by the function unit 160.

In an embodiment, in the determining step S240, whether the first gesture G1 falls within the function area 12 is determined according to whether a continuous slide trajectory of the first gesture G1 completely falls within the function area 12 from a start to an end.

Figure 3:
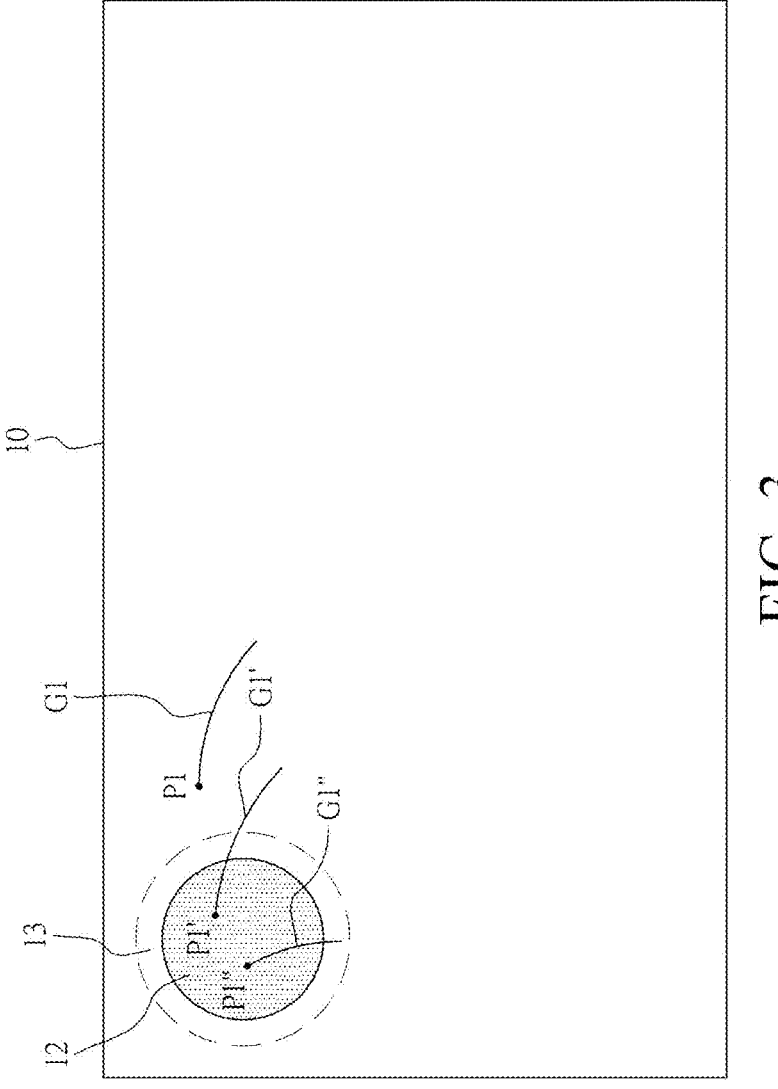
FIG. 3 shows an embodiment of a buffer area surrounding the function area.

Another embodiment of a determining manner of step S240 is described below with reference to FIG. 3. FIG. 3 shows an embodiment of a buffer area surrounding the function area.

As shown in the figure, the buffer area 13 is attached around the function area 12, and has a fixed width. In this embodiment, the function area 12 is in a circular shape, and the buffer area 130 is in an annular shape around the function area 12.

As the first gesture G1 shown in the figure, when a start position P1 of the first gesture G1 is outside the function area 12, in the determining step S240, it is determined that the first gesture G1 does not fall within the function area 12.

As a first gesture G1' shown in the figure, when a start position P1' of the first gesture G1' falls within the function area 12, but continuously move beyond the buffer area 13, in this case, in the determining step S240, it is determined that the first gesture G1 does not fall within the function area 12, and is considered as the touch pad gesture.

On the contrary, as a first gesture G1" shown in the figure, when a start position P1" of the first gesture G1" falls within the function area 12, and continuously moves outside the function area 12, but remains within the buffer area 13, it is determined that the first gesture G1" falls within the function area 12. Setting of the buffer area 13 is to avoid a mistaken situation caused by the user accidentally moving out of the function area 12 due to a touch gesture during a touch input.

Figure 4:
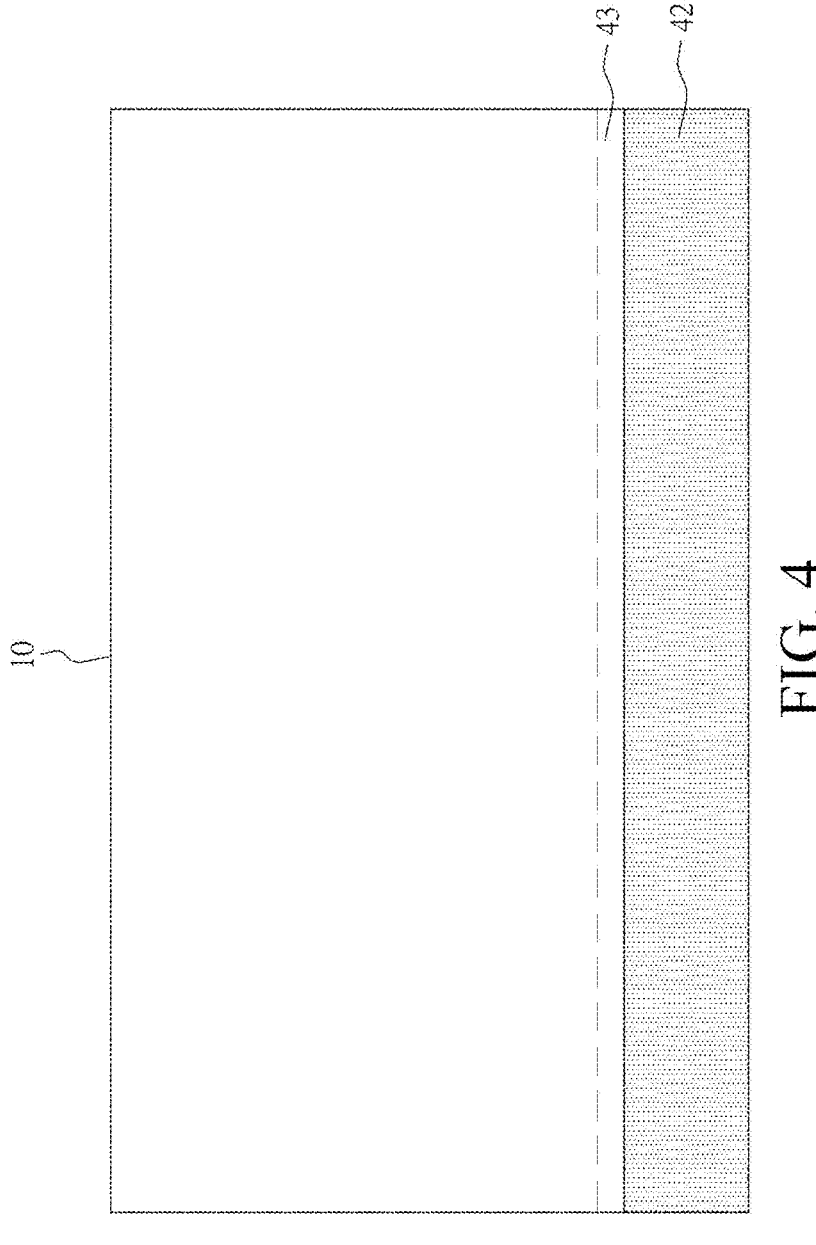
FIG. 4 shows another embodiment of a buffer area surrounding the function area.

FIG. 4 shows another embodiment of a buffer area surrounding the function area.

In an embodiment, as shown in the figure, the function area 42 is in the shape of a long bar, and is attached to an edge of the touch pad 10. In this case, the buffer area 43 is formed on a side of the function area 42 away from the edge of the touch pad 10, and has a fixed width.

In the embodiment of the control method in the second figure, the function area layout set on the touch pad includes only a single function area 12. According to an actual requirement, the function area layout set on the touch pad 10 alternatively includes a plurality of separate function areas 12.

Figure 5:
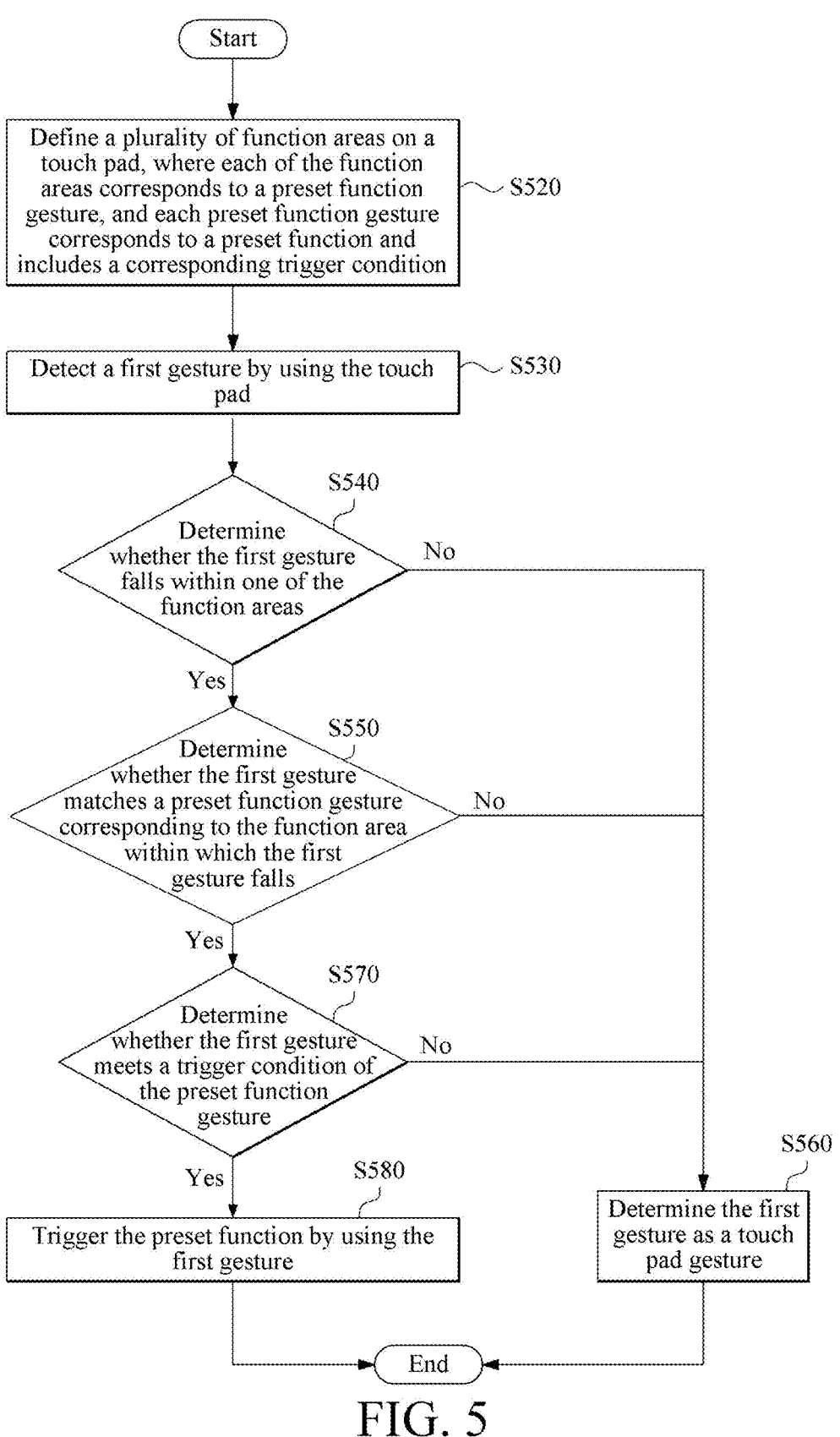
FIG. 5 is a flowchart of a control method according to a second embodiment of the disclosure.

FIG. 5 is a flowchart of a control method according to a second embodiment of the disclosure. This control method describes an embodiment in which a function area layout set on a touch pad includes a plurality of separate function areas. The control method includes the following steps.

First, in a setting stage, as described in step S520, a plurality of function areas is set on a touch pad as a function area layout. Each of the function areas corresponds to a preset function gesture. Each preset function gesture corresponds to a preset function and includes a corresponding trigger condition.

Figure 6A:
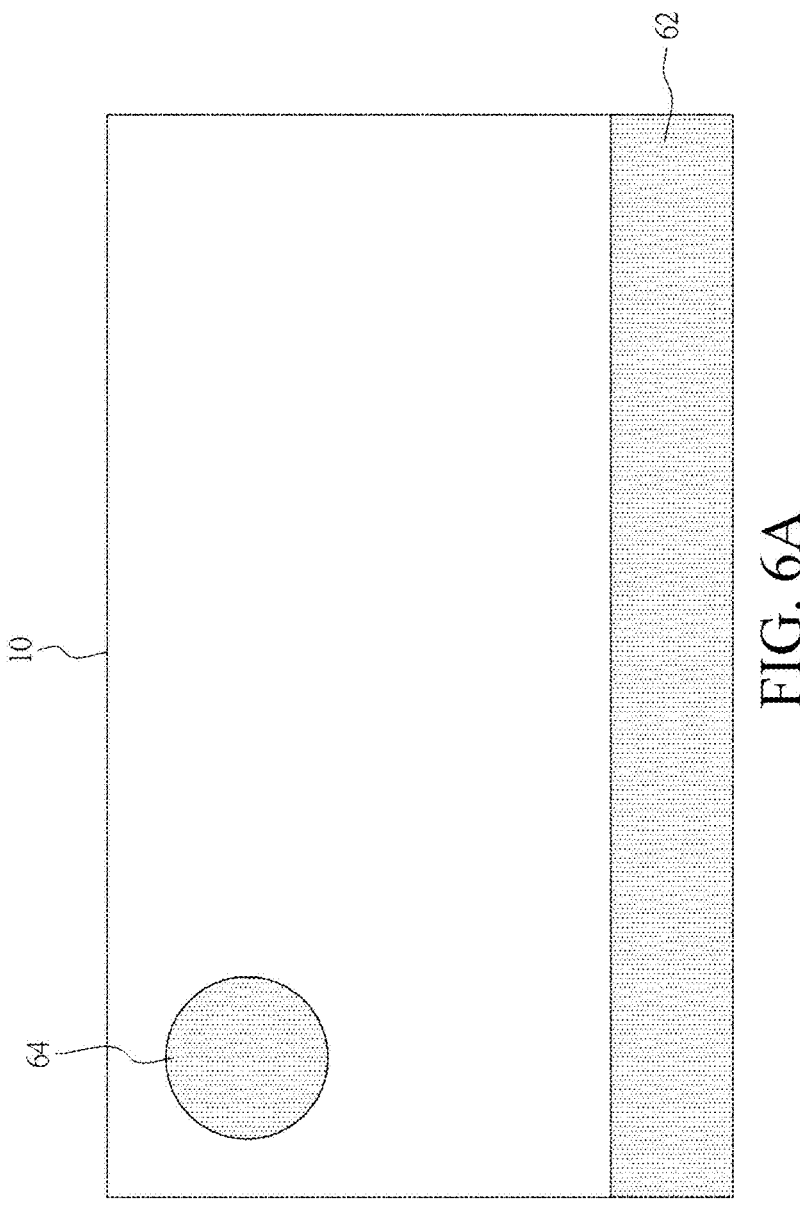
FIG. 6A shows an embodiment of a function area layout set according to step S520.

Refer to FIG. 6A together. FIG. 6A shows an embodiment of a function area layout set according to step S520. As shown in the figure, a first function area 62 and a second function area 64 are set on a touch pad 10. The first function area 62 is in a shape of a horizontal bar, and the second function area 64 is in a shape of a circle. The preset function gesture corresponding to the first function area 62 is a horizontal slide gesture, and the preset function gesture corresponding to the first function area 64 is an arc slide gesture.

Subsequently, in an operation stage, as described in step S530, a first gesture is detected by using the touch pad. Then, as described in a determining step S540, whether the first gesture falls within one of the function areas is determined. Based on the function area layout in FIG. 6A, whether the first gesture falls within the first function area 62 or the second function area 64 is determined.

When it is determined that the first gesture falls into one of the function areas, the process goes forward to a determining step S550 in which whether the first gesture matches a preset function gesture corresponding to the function area within which the first gesture falls is determined. On the contrary, when it is determined that the first gesture does not fall within any function area, the process goes forward to step S560 in which the first gesture is determined as a touch pad gesture.

In an embodiment, assuming that it is determined that the first gesture falls within the first function area 62, whether the first gesture matches a preset function gesture, namely, the horizontal slide gesture, corresponding to the first function area 62 is determined. In an embodiment, whether horizontal slide gesture is met is determined according to an angle between a movement trajectory of the first gesture and a horizontal direction. When the angle is less than a preset angle, it is determined that the horizontal slide gesture is met.

When it is determined that the first gesture matches the preset function gesture, the process goes forward to a determining step S570 in which whether the first gesture meets a trigger condition of the preset function gesture is determined. On the contrary, when the first gesture does not match the preset function gesture corresponding to the function area within which the first gesture falls, the process goes forward to step S560 in which the first gesture is determined as the touch pad gesture.

In an embodiment, assuming that it is determined that the first gesture falls within the first function area 62 and matches the horizontal slide gesture, in step S570, whether a horizontal slide distance of the first gesture is greater than a preset length is further determined. When the horizontal slide distance of the first gesture is greater than the preset length, it is determined that the trigger condition is met.

When it is determined that the first gesture meets the trigger condition, the process goes forward to step S580 in which the preset function is triggered by using the first gesture. On the contrary, when the first gesture does not meet the trigger condition, the process returns to the determining step S550 in which the first gesture continues to be detected.

Figure 6B:
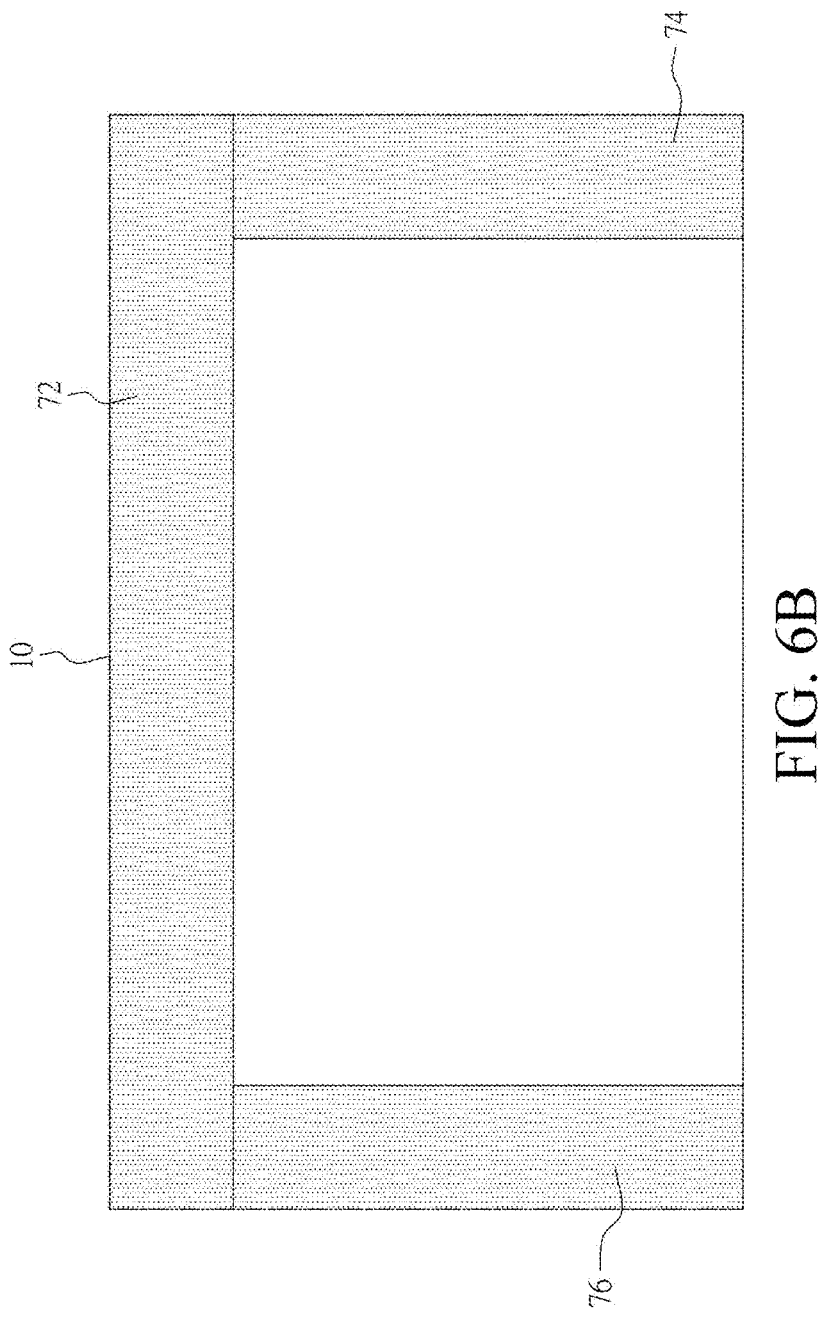
FIG. 6B shows another embodiment of a function area layout set according to step S520.

Refer to FIG. 6B together. FIG. 6B shows another embodiment of a function area layout set according to step S520.

In an embodiment, as shown in FIG. 6B, a first function area 72, a second function area 74, and a third function area 76 are set on the touch pad 10. The first function area 72 is in the shape of a horizontal bar, and is located on an upper edge of the touch pad 10. The second function area 74 and the third function area 76 are in shapes of a vertical bar, and are respectively located on a left edge and a right edge of the touch pad 10. A space in a center of the touch pad 10 is not set for the first function area 72, the second function area 74, and the third function area 76, but is reserved for general touch operations.

Figure 7A:
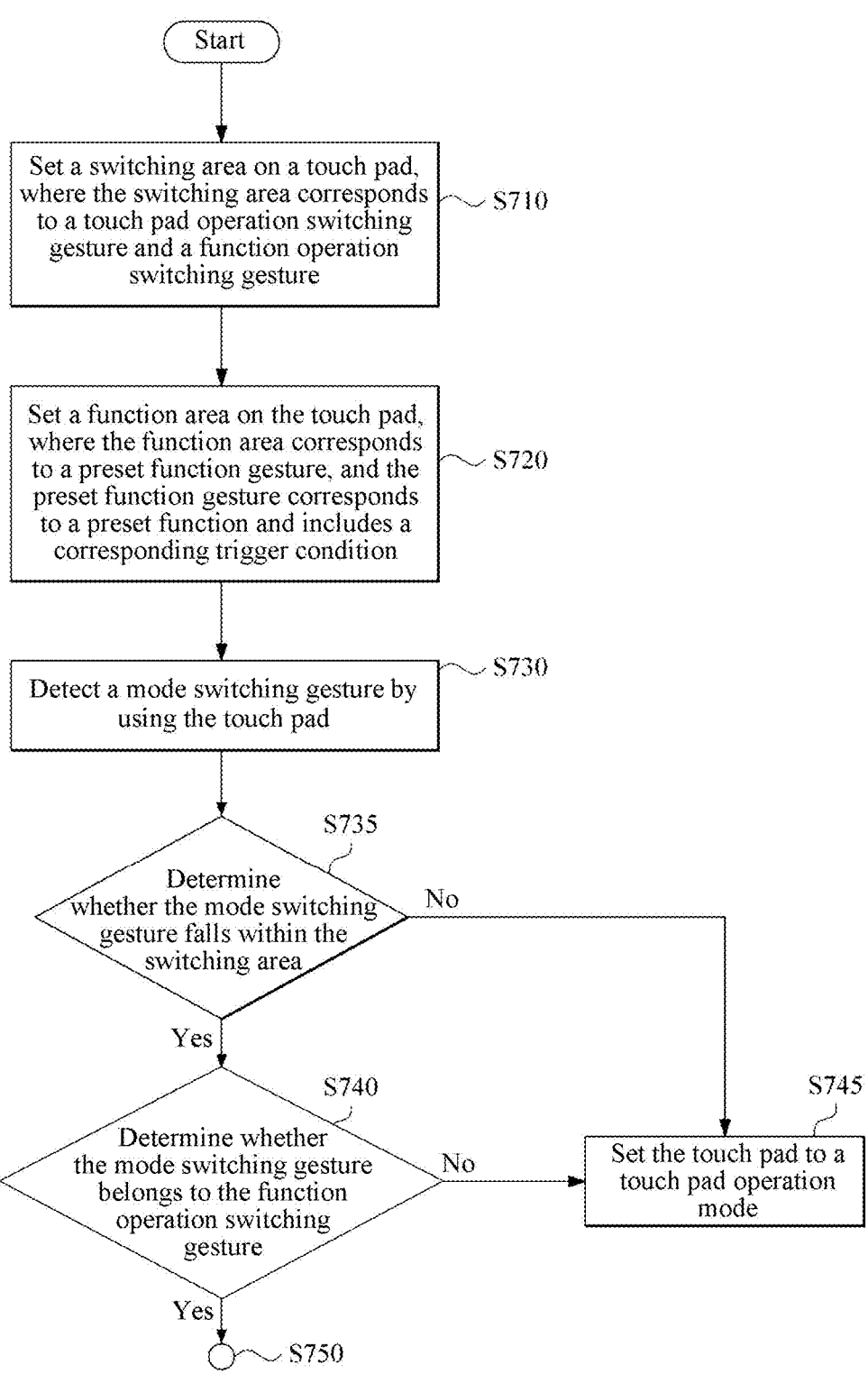
FIG. 7A and FIG. 7B are a flowchart of a control method according to a third embodiment of the disclosure.
Figure 7B:
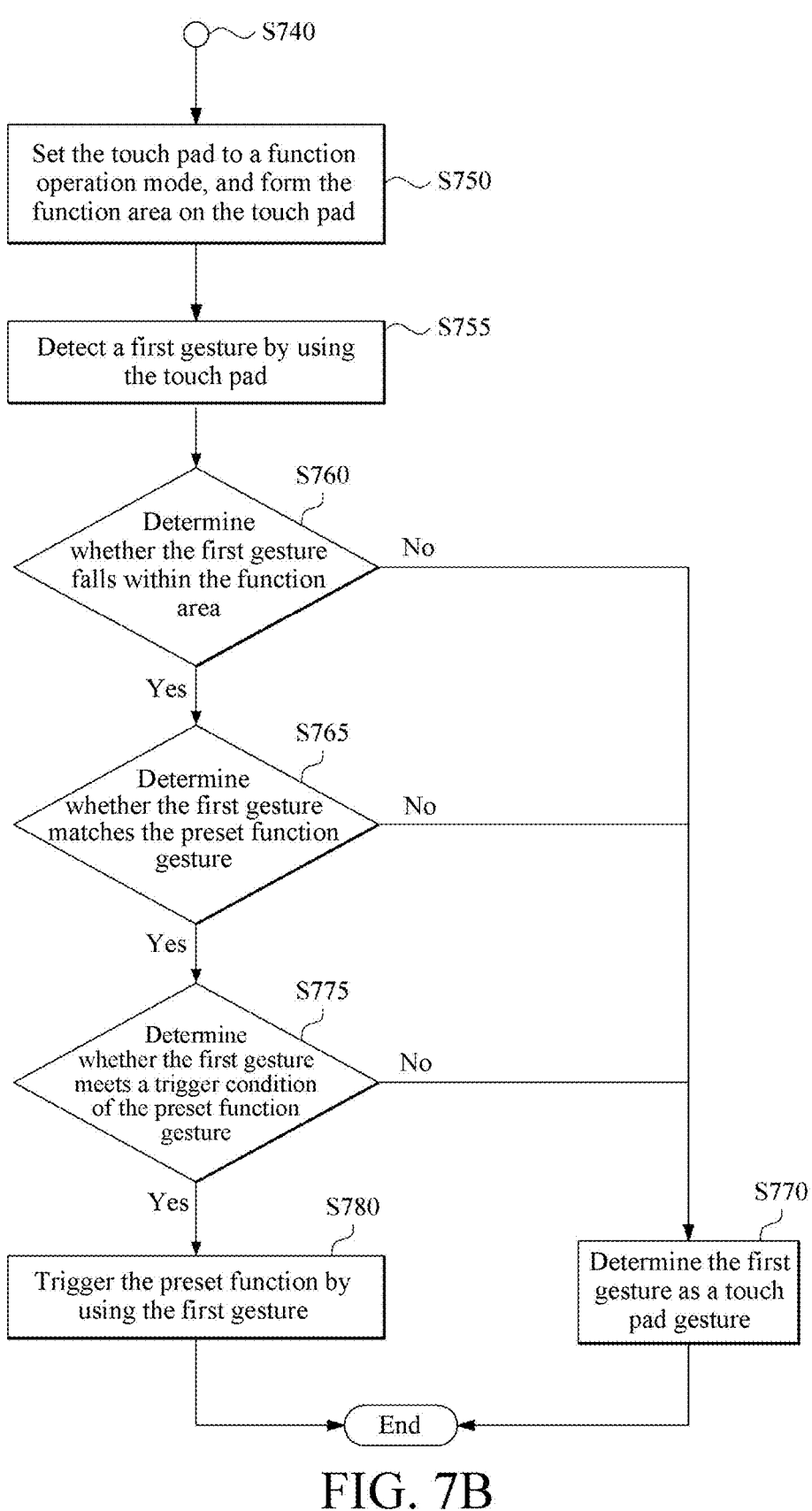

FIG. 7A and FIG. 7B are a flowchart of a control method according to a third embodiment of the disclosure. Compared with the control method in FIG. 2, a step of adding a mode switching step before entering a function operation mode is added in the control method in this embodiment. The control method includes the following steps.

First, in a setting stage, as described in step S710, a switching area is set on a touch pad. The switching area corresponds to a touch pad operation switching gesture and a function operation switching gesture. The touch pad operation switching gesture is configured to switch a mode of the touch pad to a touch pad operation mode, and the function operation switching gesture is configured to switch the mode of the touch pad to a function operation mode.

In the touch pad operation mode, no function area is set on the touch pad, and the touch pad is used simply as a general touch pad. In the function operation mode, a set function area layout is set on the touch pad. A user performs a specific function through a function area, and a general touch function is performed by an area other than the function area.

Then, as described in step S720, a function area is set on the touch pad as a function area layout. The function area corresponds to a preset function gesture. The preset function gesture corresponds to a preset function and includes a corresponding trigger condition. When the touch pad is switched to the function operation mode, the function area is formed on the touch pad. Coverage of the function area and coverage of the switching area need to be separated from each other to avoid mistaken determining.

Figure 8:
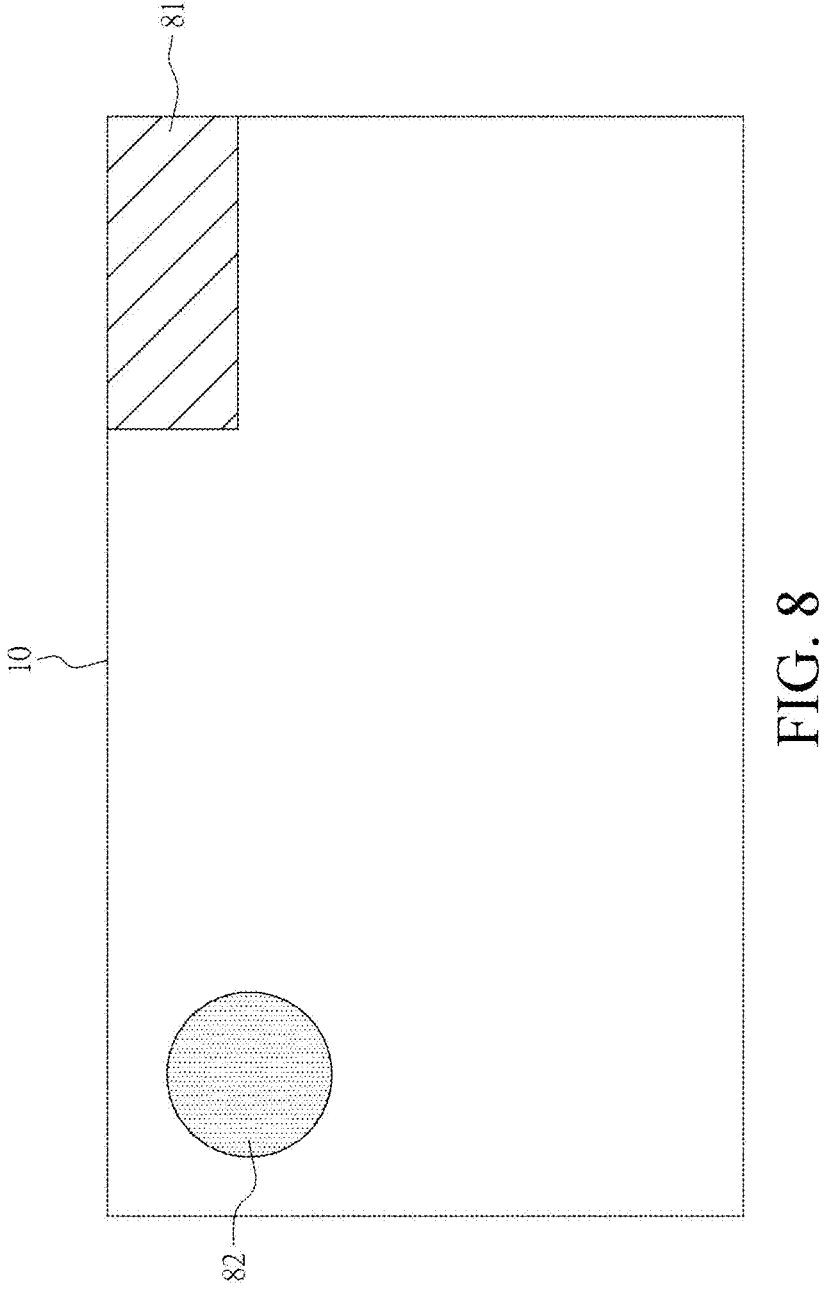
FIG. 8 shows an embodiment of a touch pad layout set according to steps S710 and S720.

Refer to FIG. 8 together. FIG. 8 shows an embodiment of a touch pad layout set according to steps S710 and S720.

As shown in the figure, a switching area 81 and a function area 82 are formed on a touch pad 10 in this embodiment. The switching area 81 is in a rectangular shape, and is located at a corner position (such as an upper right corner in the figure) of the touch pad 10. The function area 82 is in a circular shape, and is located in a left half of the touch pad 10. The circular function area 82 is used to replace a knob device, and a preset function gesture corresponding to the circular function area 82 is an arc slide gesture.

The mode switching operation is first performed in the operation stage.

First, as described in step S730, a mode switching gesture is detected by using the touch pad.

Then, as described in a determining step S735, whether the mode switching gesture falls within the switching area is determined. A determining manner of determining whether the mode switching gesture falls within the switching area in this embodiment is similar to an operating manner of determining whether the first gesture falls within the function area in the foregoing embodiment. Details are not described herein again.

When the mode switching gesture falls within the switching area, the process goes forward to a determining step S740 in which whether the mode switching gesture belongs to the function operation switching gesture is determined. A determining manner of determining whether the mode switching gesture belongs to the function operation switching gesture in this embodiment is similar to an operating manner of determining whether the first gesture matches the preset function gesture in the foregoing embodiment. Details are not described herein again.

When the mode switching gesture does not fall within the switching area, or it is determined that the mode switching gesture does not belong to the function operation switching gesture, the process goes forward to step S745 in which the touch pad is set to the touch pad operation mode, and the mode switching gesture is determined as a touch pad gesture.

When it is determined that the mode switching gesture belongs to the function operation switching gesture, the process goes forward to step S750 in which the touch pad is set to the function operation mode, so that a function area is formed on the touch pad, and the function mode operation starts.

First, as described in step S755, a first gesture is detected by using the touch pad.

Then, as described in a determining step S760, whether the first gesture falls within the function area is determined.

When the first gesture falls within the function area, the process goes forward to a determining step S765 in which whether the first gesture matches the preset function gesture is determined. On the contrary, when the first gesture does not fall within the function area, the process goes forward to step S770 in which the first gesture is determined as the touch pad gesture.

When the first gesture matches the preset function gesture, the process goes forward to a determining step S775 in which whether the first gesture meets the trigger condition of the preset function gesture is determined. On the contrary, when the first gesture does not match the preset function gesture, the process goes forward to step S770 in which the first gesture is determined as the touch pad gesture.

When the first gesture meets the trigger condition, the process goes forward to step S780 in which the preset function is triggered by using the first gesture. On the contrary, when the first gesture does not meet the trigger condition, the process returns to the determining step S765.

Step S755 to step S780 are similar to steps S230 to S280 of the control method in FIG. 2. Details are not described herein again.

As shown in FIG. 7A and FIG. 7B, in the control method provided in the third embodiment of the disclosure, a switching area (see step S710) and a function area layout (see step S720) are set on the touch pad.

Figure 9A:
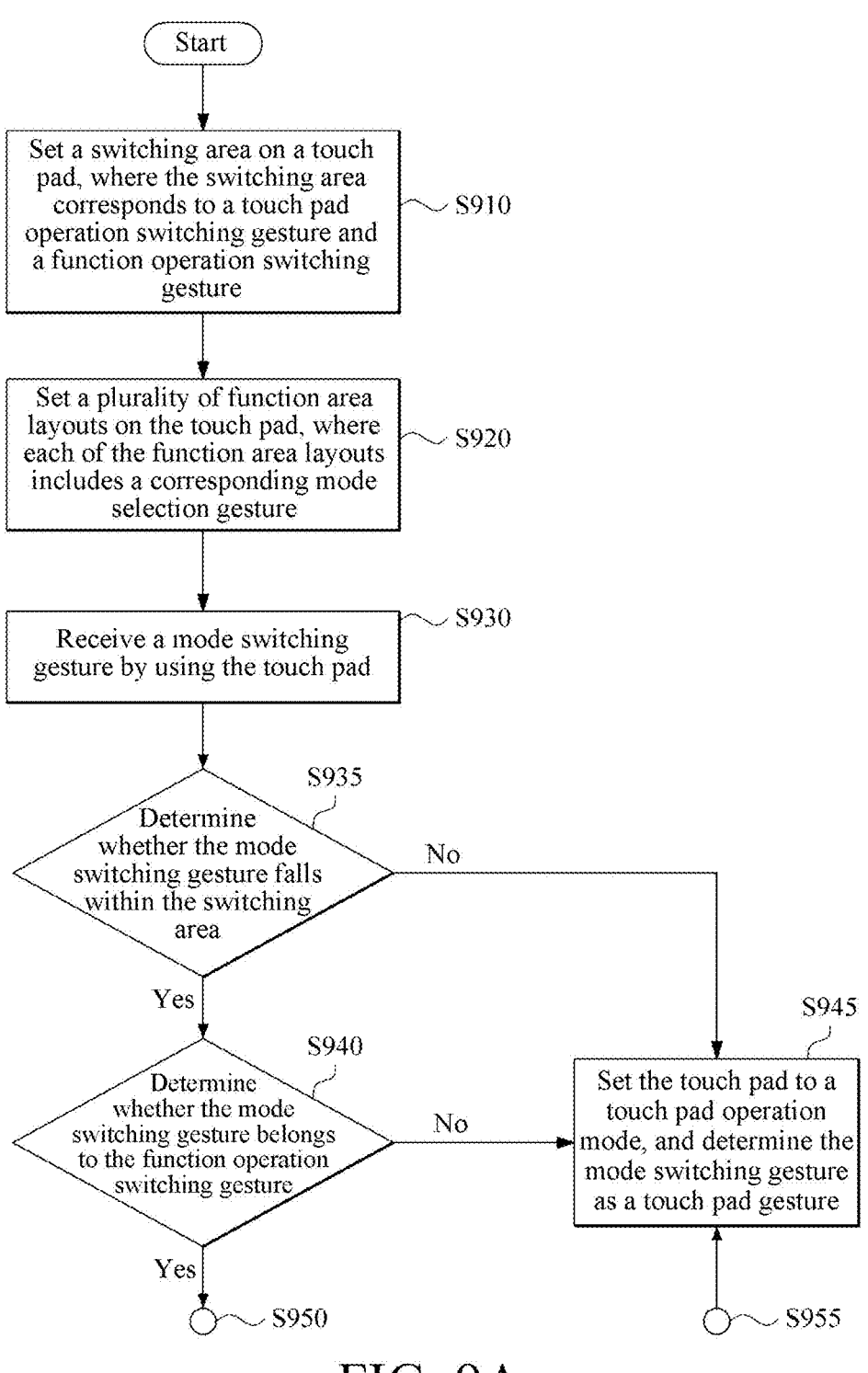
FIG. 9A and FIG. 9B are a flowchart of a control method according to a fourth embodiment of the disclosure.
Figure 9B:
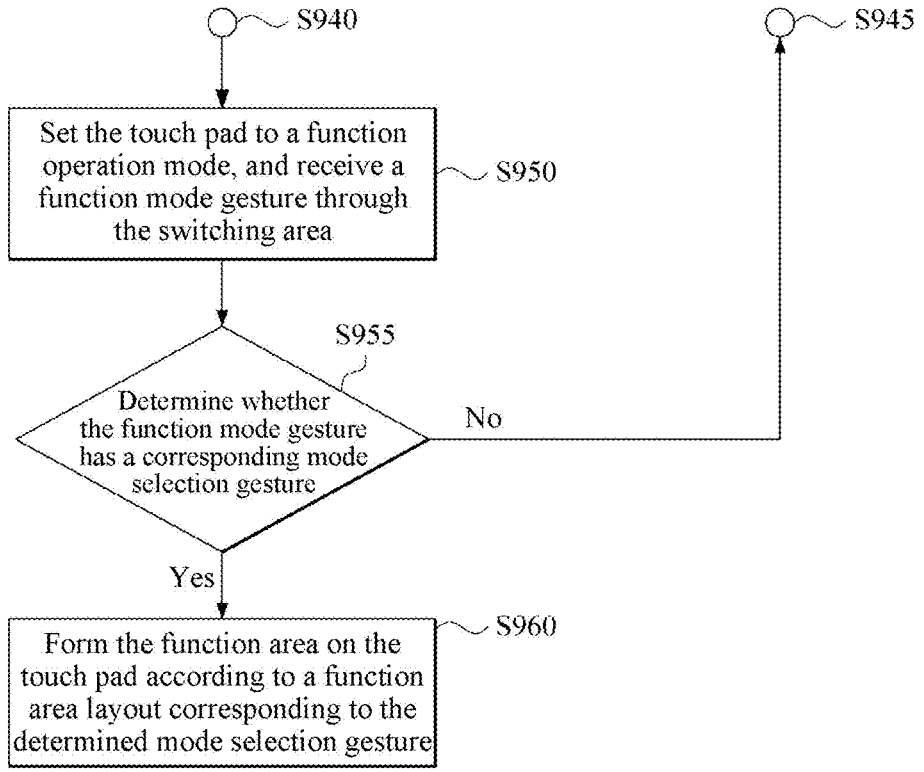

FIG. 9A and FIG. 9B are a flowchart of a control method according to a fourth embodiment of the disclosure. The flowchart shows steps from a setting stage to an operation stage in which a function area layout is selected.

First, in the setting stage, as described in step S910, a switching area is set on the touch pad. The switching area corresponds to a touch pad operation switching gesture and a function operation switching gesture.

Then, as described in step S920, a plurality of function area layouts is set on the touch pad, and each function area layout includes a corresponding mode selection gesture. Each of the function area layouts includes one or more function areas. In an embodiment, in FIG. 1, the touch pad 10 includes only the function area layout of the function area 12, and in FIG. 6A, the touch pad 10 includes the function area layout of the first function area 62 and the second function area 64.

In the operation stage, as described in step S930, a mode switching gesture is detected by using the touch pad. Then, as described in a determining step S935, whether the mode switching gesture falls within the switching area is determined.

When the mode switching gesture falls within the switching area, the process goes forward to a determining step S940 in which whether the mode switching gesture belongs to the function operation switching gesture is determined. When the mode switching gesture does not fall within the switching area, or it is determined that the mode switching gesture does not belong to the function operation switching gesture, the process goes forward to step S945 in which the touch pad is set to the touch pad operation mode, and the mode switching gesture is determined as a touch pad gesture.

When it is determined that the mode switching gesture belongs to the function operation switching gesture, the process goes forward to step S950 in which the touch pad is set to the function operation mode, and a function mode gesture is detected through the switching area.

Then, the process goes forward to step S955 in which whether the function mode gesture has a corresponding mode selection gesture is determined. When the function mode gesture has a corresponding mode selection gesture, the process goes forward to step S960 in which the function area is formed on the touch pad according to the function area layout corresponding to a determined mode selection gesture. When the function mode gesture does not have any corresponding mode selection gesture, the process goes forward to step S945 in which the touch pad is set to the touch pad operation mode.

In an embodiment, assuming that the function area layout set in step S920 is the function area layout shown in FIG. 1 and the function area layout shown in FIG. 7, for the function area layout shown in FIG. 1, a circular touch trajectory is set as a mode selection gesture, and for the function area layout shown in FIG. 7, a triangular touch trajectory is set as a mode selection gesture.

When the function mode gesture detected by the switching area corresponds to the circular touch trajectory, the function area is formed according to the function area layout shown in FIG. 1. When the function mode gesture detected by the switching area corresponds to the triangular touch trajectory, the function area is formed according to the function area layout shown in FIG. 7. When a trajectory corresponding to the function mode gesture detected by the switching area is a square, corresponding to no mode selection gesture, the function area is not formed, and the touch pad is set to the touch pad operation mode.

In this way, the user presets a plurality of different function area layouts for the touch pad according to an actual requirement. Only a simple gesture operation needs to be performed on the touch pad, to call out a required function area for operation.

Through the control method and the control system 100 provided in the disclosure, the user replaces a physical input device or an input interface with the function area 12, 62, 64, 72, 74, or 76 on the touch pad 10 to perform the preset function. In this way, multiplexing of the touch pad 10 is improved, and functions of other physical input devices (such as a mouse, a knob device, and a key device) are replaced, thereby reducing user burden on cost and carrying of the devices.

The foregoing descriptions are merely preferred embodiments of the disclosure, and do not constitute limitation on the disclosure. Variations such as equivalent replacements or modifications in any form to the technical means and technical content disclosed in the disclosure made by any person skilled in the art without departing from the scope of the technical means of the disclosure belong to the content without departing from the technical means of the disclosure, and still fall within the protection scope of the disclosure.

What is claimed is:

1. A control method, applied to a touch pad, wherein the control method comprises:

setting a function area on the touch pad, wherein the function area corresponds to a preset function gesture, and the preset function gesture corresponds to a preset function and comprises a corresponding trigger condition;

detecting a first gesture by using the touch pad;

determining whether the first gesture falls within the function area;

when the first gesture falls within the function area, determining whether the first gesture matches the preset function gesture;

when the first gesture matches the preset function gesture, determining whether the first gesture meets the trigger condition of the preset function gesture;

when the first gesture meets the trigger condition, triggering the preset function by using the first gesture, wherein the preset function gesture corresponds to a shape of the function area, and wherein when the function area is in a shape of a circle, the preset function gesture is an arc slide gesture, and the trigger condition is a rotation angle of the arc slide gesture relative to the center point of the function area exceeding a preset angle.

2. The control method according to claim 1, further comprising: when the first gesture does not fall within the function area, or the first gesture falls within the function area but does not match the preset function gesture, determining that the first gesture belongs to a touch pad gesture.

3. The control method according to claim 1, further comprising:

setting a switching area on the touch pad, wherein the switching area corresponds to a touch pad operation switching gesture and a function operation switching gesture, the touch pad operation switching gesture is for switching a mode of the touch pad to a touch pad operation mode, the function operation switching gesture is for switching the mode of the touch pad to a function operation mode, and when the touch pad is switched to the function operation mode, the function area is formed on the touch pad.

4. The control method according to claim 3, wherein the switching area is located at a corner position of the touch pad.

5. The control method according to claim 3, further comprising:

detecting a mode switching gesture by using the touch pad;

determining whether the mode switching gesture falls within the switching area; and when the mode switching gesture falls within the switching area, determining whether the mode switching gesture belongs to the function operation switching gesture, wherein when the mode switching gesture belongs to the function operation switching gesture, the touch pad is switched to the function operation mode, and the function area is formed on the touch pad.

6. The control method according to claim 5, wherein the function operation mode comprises a plurality of function area layouts and a plurality of corresponding mode selection gestures, and when the mode switching gesture is determined as the function operation switching gesture, the method further comprises:

detecting a function mode gesture through the switching area; and determining the mode selection gesture corresponding to the function mode gesture, and forming the function area on the touch pad based on the function area layout corresponding to the determined mode selection gesture.

7. The control method according to claim 1, wherein the function area is set with a buffer area surrounding the function area.

8. A control method, applied to a touch pad, wherein the control method comprises:

setting a plurality of function areas on the touch pad, wherein each of the function areas corresponds to a preset function gesture, and each preset function gesture corresponds to a preset function and comprises a corresponding trigger condition;

detecting a first gesture by using the touch pad;

determining whether the first gesture falls within one of the function areas;

when the first gesture falls within one of the function areas, determining whether the first gesture matches a preset function gesture corresponding to the function area within which the first gesture falls;

when the first gesture matches the preset function gesture, determining whether the first gesture meets a trigger condition of the preset function gesture; and when the first gesture meets the trigger condition, triggering the preset function by using the first gesture, wherein the preset function gesture corresponds to a shape of the function area, and wherein when the function area is in a shape of a circle, the preset function gesture is an arc slide gesture, and the trigger condition is a rotation angle of the arc slide gesture relative to the center point of the function area exceeding a preset angle.

9. The control method according to claim 8, further comprising: when the first gesture does not fall within the function areas, or the first gesture falls within one of the function areas but does not match the preset function gesture corresponding to the function area within which the first gesture falls, determining that the first gesture belongs to a touch pad gesture.

10. A control system, configured for a touch pad, wherein the control system comprises:

a setting unit, electrically coupled to the touch pad, and configured to set a function area on the touch pad, wherein the function area corresponds to a preset function gesture, and the preset function gesture corresponds to a preset function and comprises a corresponding trigger condition;

a gesture recognition unit, electrically coupled to the touch pad, and configured to:

detect a first gesture by using the touch pad;

determine whether the first gesture falls within the function area;

when the first gesture falls within the function area, determine whether the first gesture matches the preset function gesture;

when the first gesture matches the preset function gesture, determine whether the first gesture meets the trigger condition of the preset function gesture; and when the first gesture meets the trigger condition, generate a function trigger signal according to the first gesture; and a function unit, configured to receive the function trigger signal to perform the preset function, wherein the preset function gesture corresponds to a shape of the function area, and wherein when the function area is in a shape of a circle, the preset function gesture is an arc slide gesture, and the trigger condition is a rotation angle of the arc slide gesture relative to the center point of the function area exceeding a preset angle.

* * * * *